US012312840B2

(12) United States Patent
Stojc et al.

(10) Patent No.: US 12,312,840 B2
(45) Date of Patent: May 27, 2025

(54) DOOR LOCK RELEASE MECHANISM

(71) Applicant: Transportation IP Holdings, LLC, Norwalk, CT (US)

(72) Inventors: Andre Stojc, Ile Bizard (CA); Daniel Filion, Prevost (CA)

(73) Assignee: Transportation IP Holdings, LLC, Norwalk, CT (US)

( * ) Notice: Subject to any disclaimer, the term of this patent is extended or adjusted under 35 U.S.C. 154(b) by 699 days.

(21) Appl. No.: 17/552,353

(22) Filed: Dec. 16, 2021

(65) Prior Publication Data

US 2022/0106815 A1 Apr. 7, 2022

Related U.S. Application Data

(63) Continuation-in-part of application No. 15/765,791, filed as application No. PCT/US2016/059674 on Oct. 31, 2016, now Pat. No. 11,313,156.

(Continued)

(51) Int. Cl.
*E05B 81/08* (2014.01)
*E05B 77/02* (2014.01)
(Continued)

(52) U.S. Cl.
CPC .............. *E05B 81/08* (2013.01); *E05B 77/02* (2013.01); *E05B 77/54* (2013.01); *E05B 81/28* (2013.01); *E05B 83/363* (2013.01)

(58) Field of Classification Search
CPC ...... E05B 81/08; E05B 47/0002; E05B 47/06; E05B 47/0603; E05B 47/0006
See application file for complete search history.

(56) References Cited

U.S. PATENT DOCUMENTS 4,752,092 A * 6/1988 Faust ...................... E05B 79/20 292/201
5,044,678 A * 9/1991 Detweiler ............... E05B 79/20 292/DIG. 60

(Continued)

FOREIGN PATENT DOCUMENTS

DE 19924028 A1 * 11/2000 ............. E05B 79/20
EP 0736655 A1 * 10/1996

(Continued)

OTHER PUBLICATIONS

International Search Report and Written Opinion for corresponding PCT/US2016/059674, dated Jan. 3, 2017.

*Primary Examiner* — Alyson M Merlino
(74) *Attorney, Agent, or Firm* — K&L Gates LLP

(57) ABSTRACT

A vehicle door lock release mechanism includes a plate assembly coupled with a vehicle, sliding plates that slide in opposite directions, an elastic member coupled with the plate assembly, and electromagnets coupled with the plate assembly. One electromagnet may be energized to prevent movement of a first sliding plate while a second sliding plate may move responsive to a release cable being pulled. The second electromagnet may be energized to magnetically couple with and prevent movement of the second sliding plate once the second sliding plate reaches the second electromagnet. The elastic member may be stretched and store energy from the release cable being pulled while both the first and second electromagnets remain energized. The first electromagnet may be de-energized to permit movement of the first sliding plate and release the energy stored in the elastic member for opening a door of the vehicle.

20 Claims, 9 Drawing Sheets

Related U.S. Application Data

(60) Provisional application No. 62/250,550, filed on Nov. 4, 2015.

(51) Int. Cl.

| | |
|---|---|
| ***E05B 77/54*** | (2014.01) |
| ***E05B 79/20*** | (2014.01) |
| ***E05B 81/28*** | (2014.01) |
| ***E05B 83/36*** | (2014.01) |

(56) References Cited

U.S. PATENT DOCUMENTS

| | | | | |
|---|---|---|---|---|
| 5,076,622 | A * | 12/1991 | Detweiler | E05B 79/20 292/DIG. 60 |
| 5,664,811 | A * | 9/1997 | Martus | E05B 83/34 292/144 |
| 11,313,156 | B2 | 4/2022 | Stojc et al. | |
| 2005/0235866 | A1* | 10/2005 | Stojc | E05B 83/40 105/343 |
| 2007/0126243 | A1* | 6/2007 | Papanikolaou | E05B 79/20 292/201 |
| 2010/0123323 | A1* | 5/2010 | Geringer | E05B 47/023 292/164 |
| 2010/0188177 | A1* | 7/2010 | Inage | E05B 47/026 335/205 |
| 2013/0140831 | A1* | 6/2013 | Kempel | E05B 83/26 292/3 |
| 2017/0016250 | A1* | 1/2017 | Sümegi | E05B 79/20 |
| 2018/0319410 | A1* | 11/2018 | Stojc | E05B 79/20 |

FOREIGN PATENT DOCUMENTS

| | | | | |
|---|---|---|---|---|
| EP | 1365095 | A2 * | 11/2003 | E05F 15/603 |
| FR | 2635493 | A1 * | 2/1990 | |
| WO | 2017079084 | A1 | 5/2017 | |

* cited by examiner

DOOR LOCK RELEASE MECHANISM

CROSS-REFERENCE TO RELATED APPLICATIONS

This application is a continuation-in-part of U.S. patent application Ser. No. 15/765,791 (filed 4 Apr. 2018), which is a national stage entry of International PCT Application No. PCT/US2016/059674 (filed 31 Oct. 2016), which claims priority to U.S. Provisional Application No. 62/250,550 (filed 4 Nov. 2015), the entire disclosures of which are incorporated herein by reference.

BACKGROUND

Technical Field

This invention relates to a release mechanism for vehicle doors.

Discussion of Art

It is essential that transit vehicle doors be locked during normal operation while the vehicle is moving so that a passenger leaning against or falling against the door does not push open the doors and fall out of the vehicle. However, in an emergency, there must be a provision for unlocking the door. Certain transit authority operational procedures require the train to have reached full stop prior to allowing the doors to be unlocked, even in an emergency situation.

In the case of emergency, a passenger actuates a release handle. The handle (rotating or linear motion) pulls on a release cable. The release cable is connected to the door lock actuator mechanism to unlock the door.

FIG. 4 illustrates a plan view of a swing plug door for a vehicle door, such as a door of a transit vehicle. Door panels 50 move from a closed position to an open position that is generally perpendicular to the closed position. The door panels are hung from a track 51 that is parallel to the closed door by a follower 52. The door is unlocked by initial rotation of a door post 56 that is connected to a leading edge (when opening) by a lever 57 extending from the door post. The door post is caused to rotate by a door operator 53 via a connecting rod 54 and a bell crank 55. In the case of FIG. 4, the door lock is an overcenter mechanism. More generally, a door lock may be associated with any number of the elements from the door operator to the door post and door panel.

A manual release cable may be directly coupled to a lock actuator mechanism and the door panels become unlocked when the cable is pulled. Unfortunately, if the vehicle (e.g., train) is either still moving, stopped between stations, or if the door is on the wrong side of the vehicle while adjacent a station platform when the door is manually unlocked, etc., the passenger could get injured.

In the past, a motor driving the doors was energized to attempt to keep the doors closed to prevent a passenger from leaving the vehicle when unsafe to do so after the release handle has been actuated. However, the passenger with extra force can still force the doors open as the motors can only apply a limited amount of resistance force. Driving the doors in the closed position can cause the motors to overheat to the detriment of the motors. Also, the passenger can damage the door control mechanism when forcing the doors open.

In the past, a mechanism was provided to prevent the release handle from being moved so long as it is unsafe and, thus, the release cable from being pulled. However, this can frustrate the passenger and result in the handle being broken by the application of too much force. Also, when safe to do so, the passenger must again actuate the release handle. This presupposes that the passenger knows when it is safe to do so.

BRIEF DESCRIPTION

The manual release mechanism described herein enables a passenger to attempt to manually open the transit door but delays opening until the vehicle is no longer moving.

In one example, a vehicle door lock release mechanism is provided. The mechanism includes a plate assembly that may be coupled with a vehicle and include a first sliding plate and a second sliding plate that slide in opposite directions relative to each other. The second sliding plate may be pulled away from the first sliding plate by a release cable. The mechanism also can include an elastic member coupled with the plate assembly and first and second electromagnets coupled with the plate assembly. The first electromagnet may be energized to magnetically couple with and prevent movement of the first sliding plate while the second sliding plate may move toward the second electromagnet responsive to the release cable being pulled. The second electromagnet may be energized to magnetically couple with and prevent movement of the second sliding plate once the second sliding plate reaches the second electromagnet. The elastic member may be stretched and store energy from the release cable being pulled while both the first and second electromagnets remain energized. The first electromagnet may be de-energized to permit movement of the first sliding plate and release the energy stored in the elastic member for opening a door of the vehicle.

In another example, a vehicle door control system is provided that includes the vehicle door lock release mechanism and a control unit operably coupled to the vehicle door lock release mechanism. The control unit may energize the first and second electromagnets during movement of the vehicle above a designated threshold speed to prevent opening of the door of the vehicle regardless of the release cable being pulled. The control unit may de-energize the first electromagnet responsive to the movement of the vehicle being no faster than the designated threshold speed to delay opening of the door of the vehicle following pulling on the release cable.

In another example, a vehicle door lock release mechanism is provided that includes a plate assembly including a base plate, a first sliding plate, and a second sliding plate. The base plate may be coupled with a vehicle. The first and second sliding plates may move relative to each other along the base plate. The mechanism also includes an elastic member coupled with the first and second sliding plates, and first and second electromagnets coupled with the base plate. The first electromagnet may be energized to magnetically couple with and prevent movement of the first sliding plate. The second electromagnet may be energized to magnetically couple with and prevent movement of the second sliding plate. The second sliding plate may be pulled along the base plate away from the first sliding plate, away from the first electromagnet, and toward the second electromagnet by pulling of a door lock release cable. The elastic member may be stretched between the first and second sliding plates by the first electromagnet preventing movement of the first sliding plate and the second electromagnet preventing movement of the second sliding plate. The first electromagnet may be de-energized to permit the elastic member to pull the first sliding plate away from the first electromagnet and toward the second sliding plate and thereby release energy stored in the elastic member to open a door of the vehicle.

In another example, a vehicle door control system is provided that includes the vehicle door lock release mechanism and a control unit that may be operably coupled to the vehicle door lock release mechanism. The control unit may energize the first and second electromagnets during movement of the vehicle above a designated threshold speed to prevent opening of the door of the vehicle regardless of the door lock release cable being pulled.

In another example, a method is provided that includes energizing a first electromagnet to secure a first sliding plate to the first electromagnet during movement of a vehicle. The first sliding plate may rotate a door post to open a door of the vehicle when the first sliding plate moves away from the first electromagnet. The method also can include receiving a pulling action on a door lock release cable on a second sliding plate. This pulling action may move the second sliding plate toward a second electromagnet. The method also can include securing the second sliding plate against the second electromagnet by energizing the second electromagnet, and de-energizing the first electromagnet to release the first sliding plate from the first electromagnet and permit the door of the vehicle to open.

BRIEF DESCRIPTION OF THE DRAWINGS

Further features and other objects and advantages of the invention will become apparent from the following detailed description made with reference to the drawings.

DETAILED DESCRIPTION

Figure 1:
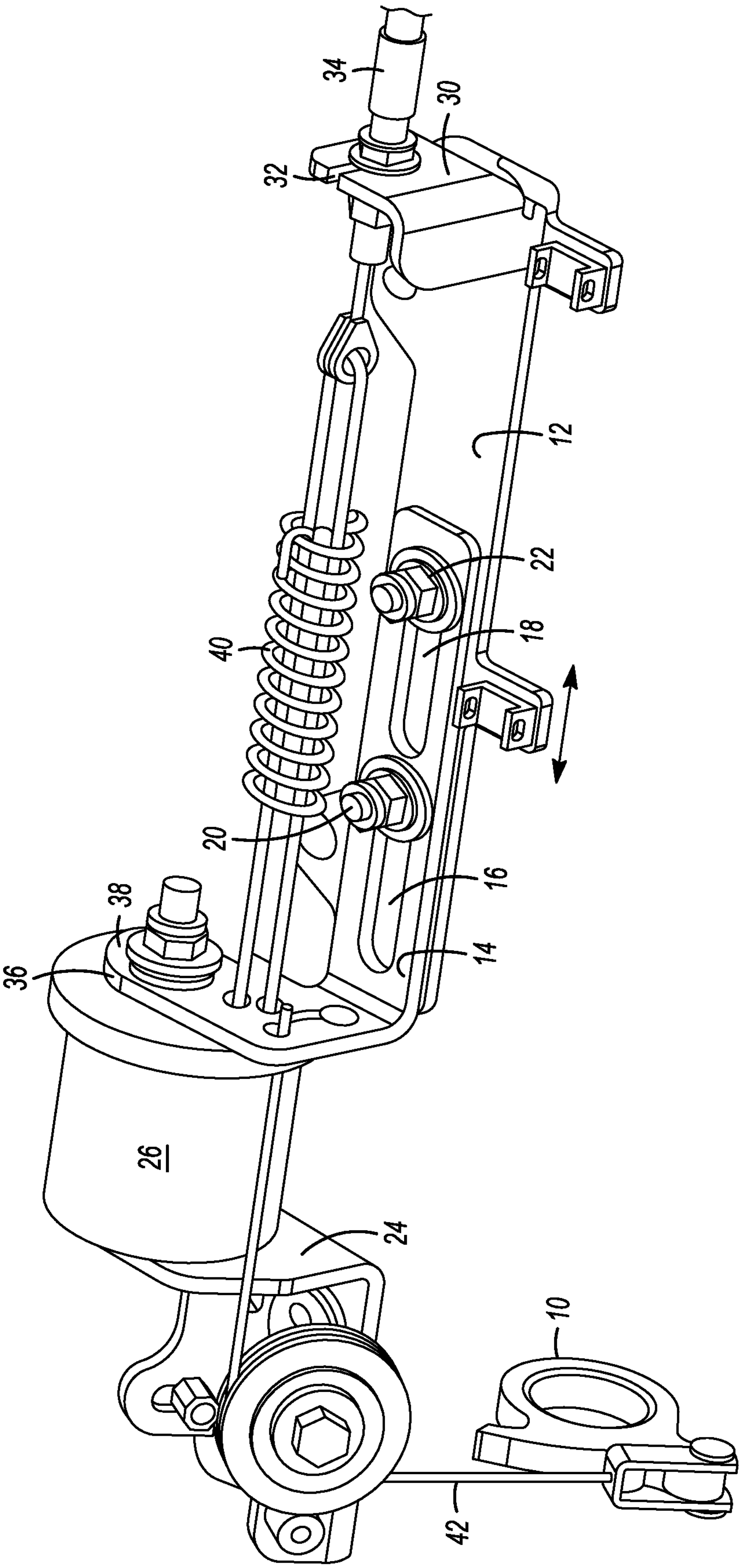
FIG. 1 is a schematic and prospective view of one example of an emergency manual door lock release mechanism for releasing a door lock on a transit vehicle when energy is not stored in the spring and release is not actuated.

Referring now to the drawings, an emergency manual door lock release mechanism for releasing a door lock 10 on a vehicle door (e.g., a transit vehicle door) includes a base plate 12 for being secured to a wall or frame of the vehicle. A sliding plate 14 abuts and may be movable relative to the base plate. The sliding plate has at least one elongate slot 16, 18. At least one pin 20, 22 is fixed to the base plate 12 extending into the at least one elongate slot constraining the relative movement between the base plate and sliding plate in a lateral direction indicated by the double head arrow.

An electromagnet support bracket 24 is secured to the transit vehicle adjacent the base plate 12 near one lateral end. An electromagnet 26 is supported by the electromagnet support bracket 24.

A first end bracket 30 is fixed at or near one lateral end of the base plate 12 and has an aperture 32 therein for receiving the sleeve of a manual release Bowden cable 34. A second end bracket 38 is fixed at or near the opposite lateral end of the sliding plate 14 from the first bracket. The second end bracket positions a magnetizable steel plate 36 to be captured by the electromagnet 26.

A coil spring 40, which extends in the lateral direction, stores energy when stretched. The coil spring 40 is anchored directly or indirectly at one end to the second end bracket 38 and is connected at the other end directly or indirectly to the manual release cable 34. A motion transfer cable, lever, or bar 42 is connected to the second end bracket 38, such that when the sliding plate 14 moves away from the electromagnet 26, the door lock 10 will be released only when the manual release cable 34 is pulled to store energy in the coil spring 40, and the electromagnet 26 is de-energized to release the magnetic plate 36.

As shown in FIG. 1, the coil spring 40 is relaxed and the electromagnet 26 is energized and the door is locked. This is the normal position when the transit vehicle is moving between stations.

Figure 2:
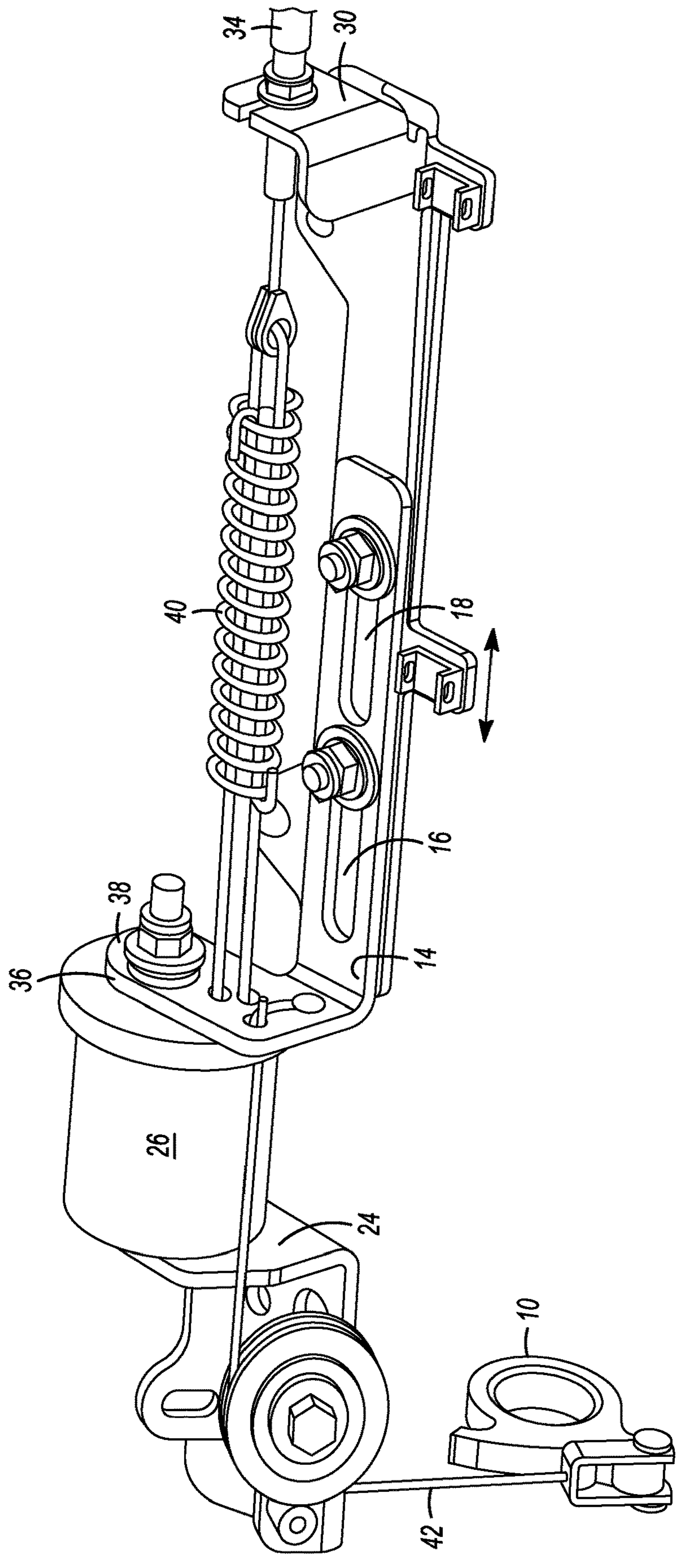
FIG. 2 is a schematic and prospective view of the emergency manual door lock release mechanism shown in FIG. 1 with energy stored in the spring but the door lock is not released.

As shown in FIG. 2, the coil spring 40 is energized as a passenger, for example, has pulled the manual release cable 34, but the transit vehicle doors are not unlocked as the electromagnet is still energized. The manual release cable may be maintained pulled by a latch associated with the cable and first end plate.

Figure 3:
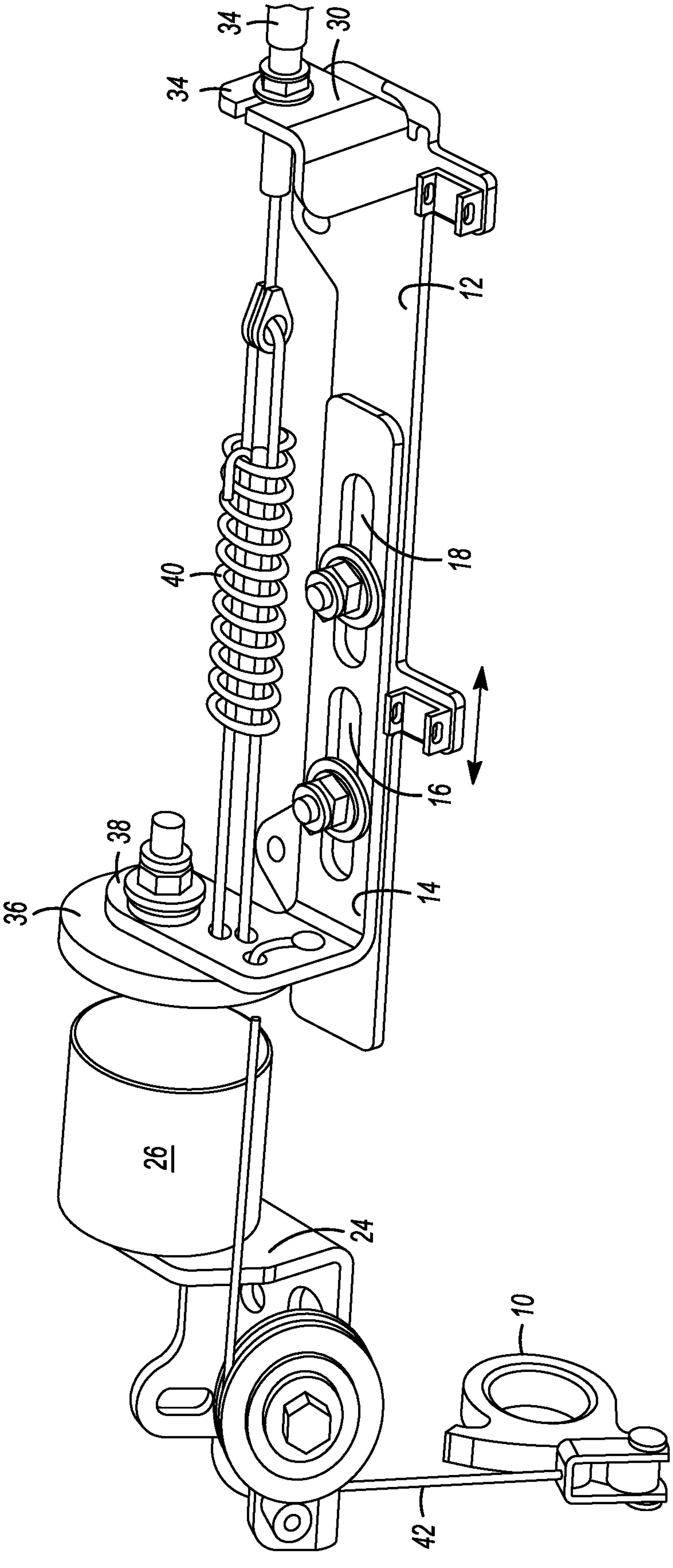
FIG. 3 is a schematic and prospective view of the emergency manual door lock release mechanism shown in FIG. 1 when manual release has been attempted and the door lock has been released.

As shown in FIG. 3, the electromagnet 26 is de-energized and the sliding plate 14, under the bias of the coil spring 40, has moved the sliding plate 14 away from the electromagnet 26 pulling the motion transfer cable 42 to unlock the door lock 10. Unlocking is delayed until the electromagnet 26 is de-energized when the transit vehicle comes to a stop.

Figure 5:
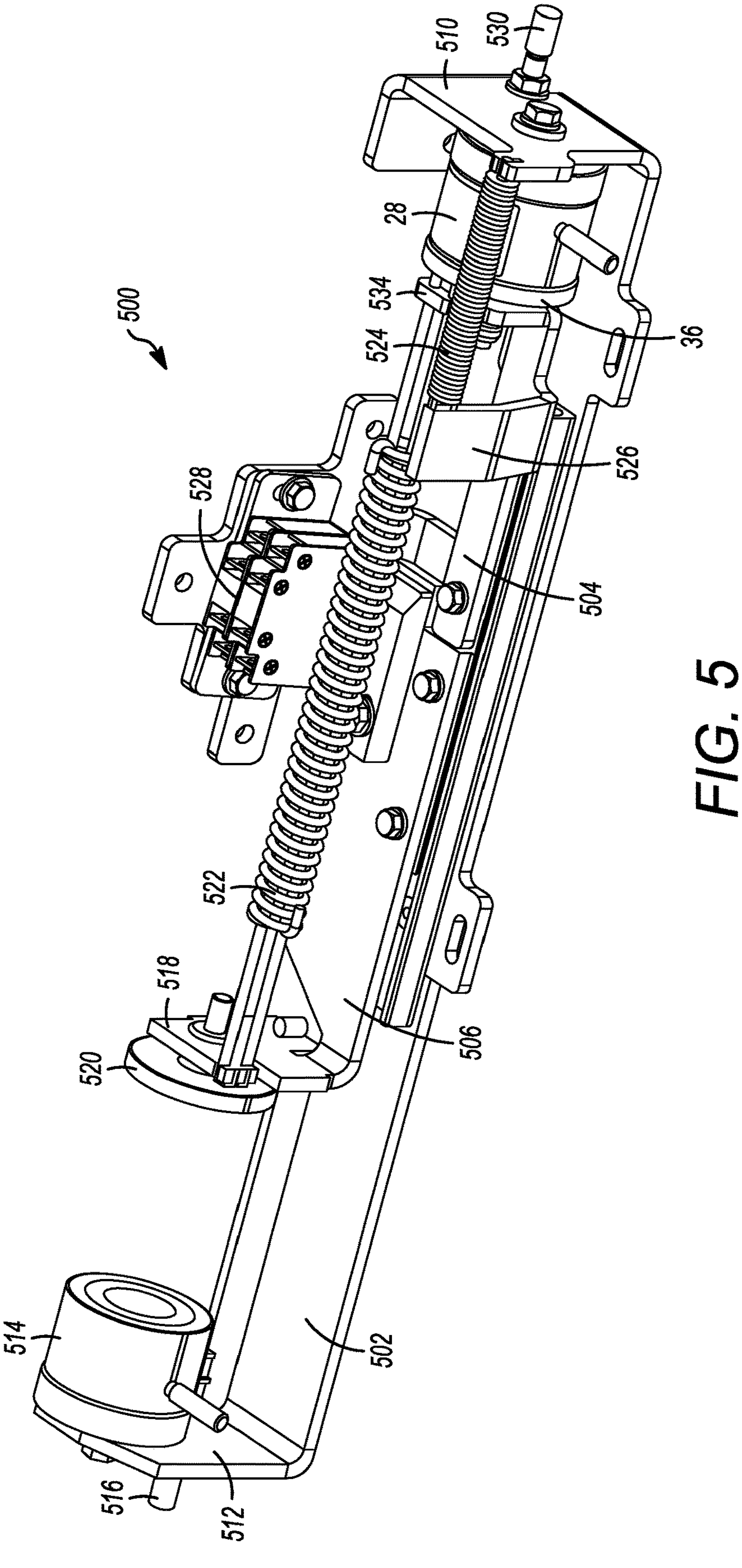
FIG. 5 illustrates another example of an emergency manual door lock release mechanism for releasing a door lock with the mechanism in a reset or initial state.
Figure 6:
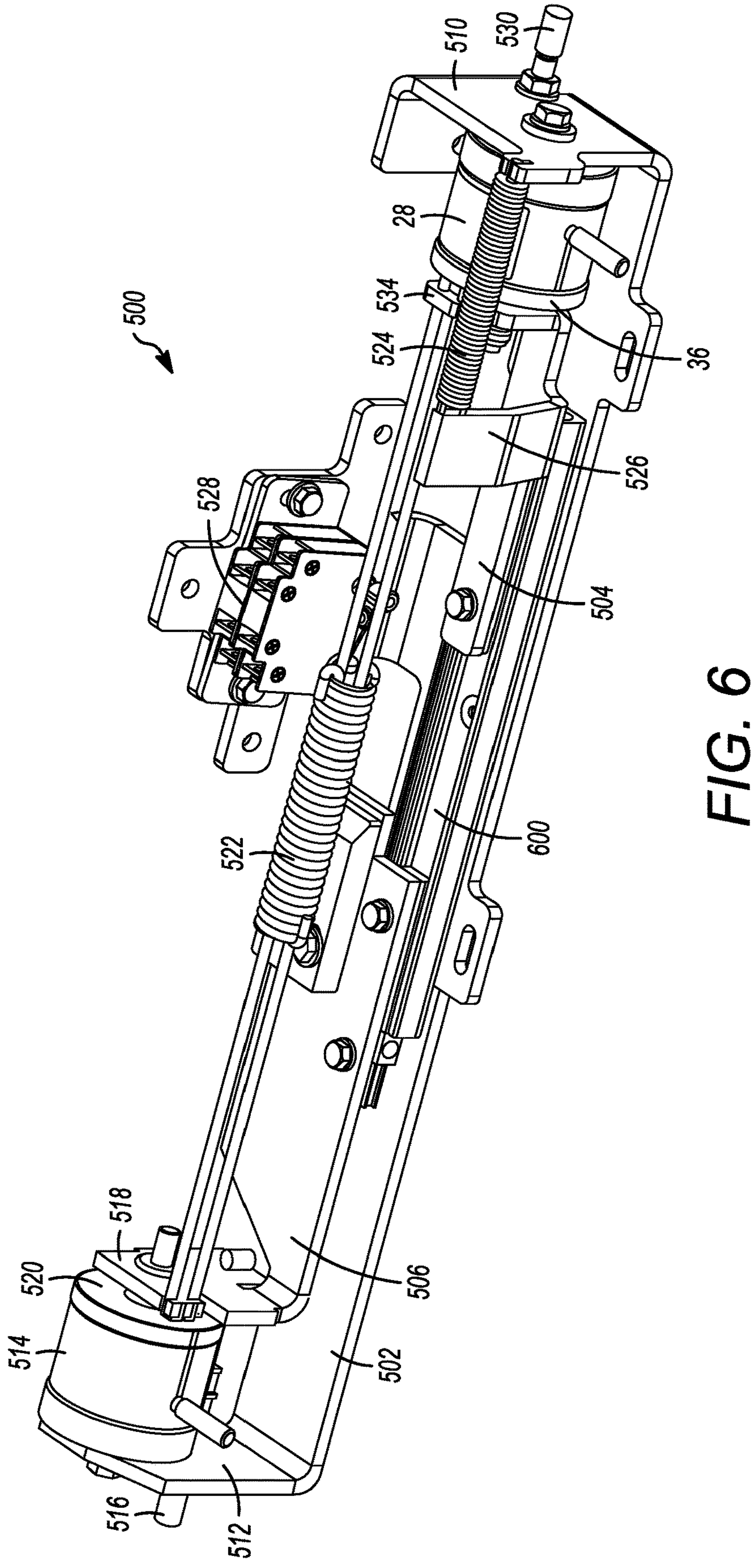
FIG. 6 illustrates the lock release mechanism shown in FIG. 5 in an energy storage state.
Figure 7:
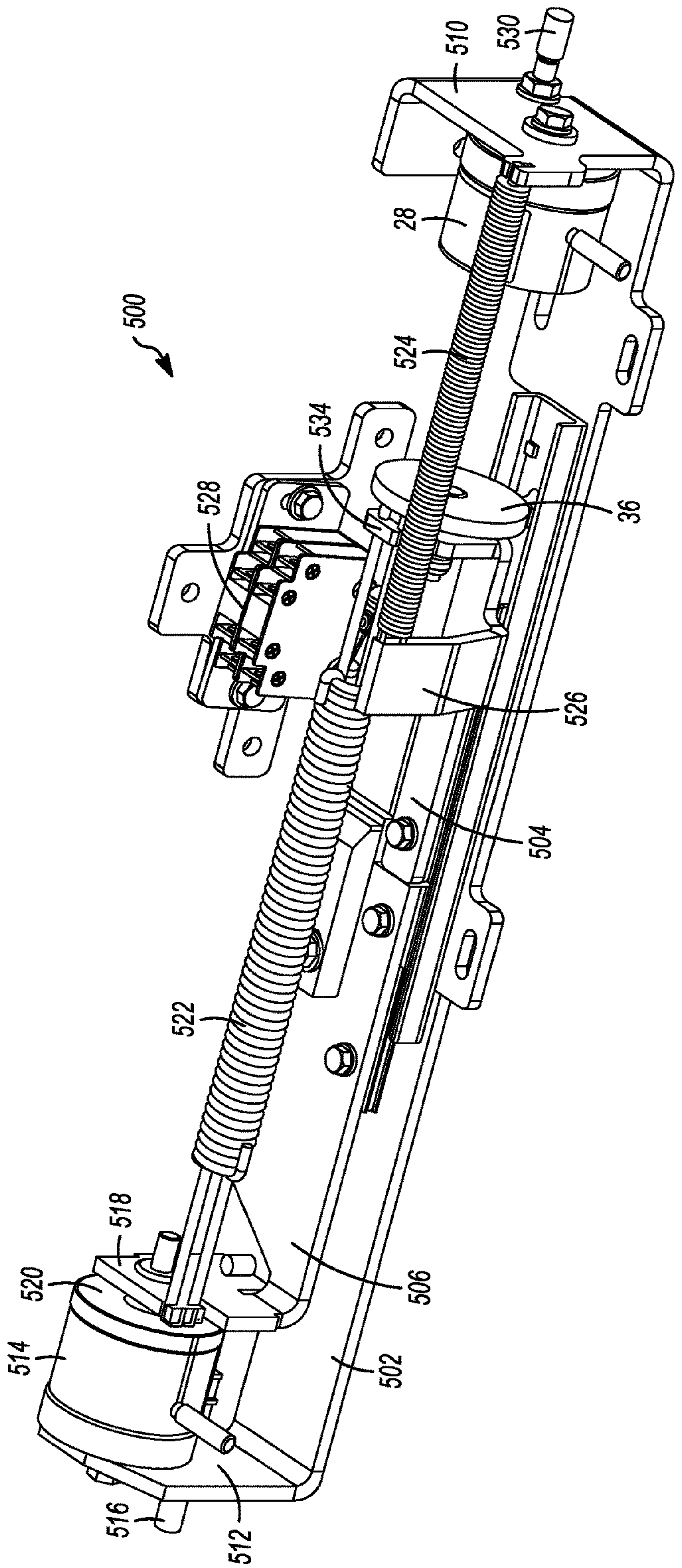
FIG. 7 illustrates the lock release mechanism shown in FIG. 5 in a lock release or doors open state.

FIGS. 5 through 7 illustrate another example of an emergency manual door lock release mechanism 500 for releasing a door lock. This mechanism can operate to receive energy from a passenger pulling on an emergency release cable to command the opening of the door, while at the same time preventing the door from opening due to an unsafe situation (e.g., the vehicle is still moving at a speed where it would be unsafe for the door to be opened). The mechanism can store the energy provided by pulling on the cable until a time at which it is safe or safer to open the doors, such as when the vehicle slows or stops. The mechanism can then release this energy to open the doors to allow the passenger (s) to leave the vehicle. The mechanism can be used with a variety of different types of doors or door systems, such as a slide-plug door or slide-glide door.

The illustrated example of the mechanism includes a plate assembly formed from a base plate 502, a first sliding plate 504, and a second sliding plate 506. The base plate is secured or otherwise fastened to a surface of a vehicle, such as an interior surface of a transit vehicle. The first and second sliding plates abut the base plate and can move (e.g., slide) relative to the base plate and to each other. For example, the base plate may have a rail 600 (shown in FIG. 6) on or along which the sliding plates move toward each other, away from each other, or in the same direction. Alternatively, the rail may be a slot or trough in which parts of the sliding plates move. The rail, slot, or trough can constrain the relative movement between the base plate and the sliding plates, such as by limiting or preventing movement of the sliding plates in directions that are transverse to the directions in which the rail, slot, or trough is elongated.

Figure 4:
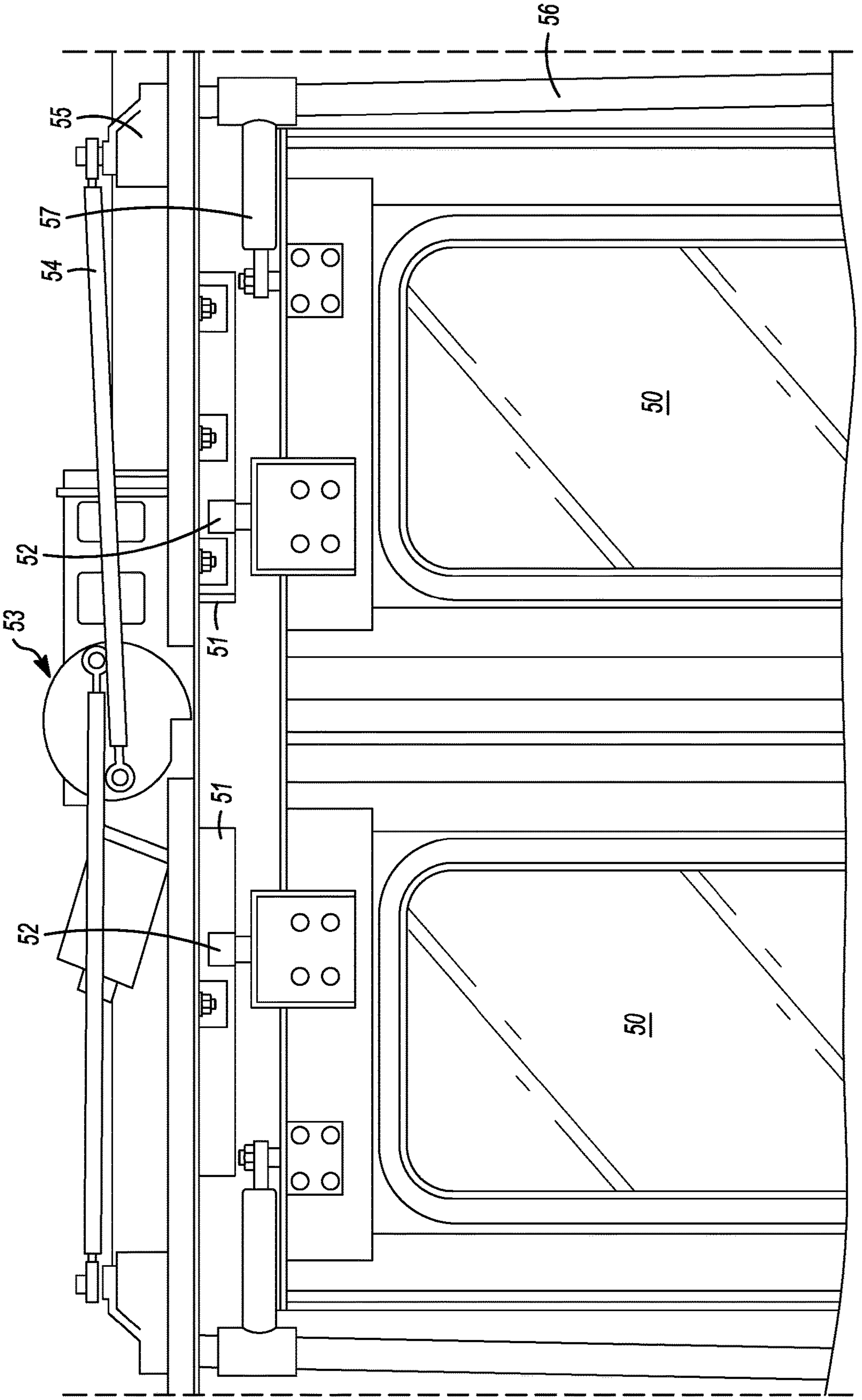
FIG. 4 PRIOR ART
FIG. 4 illustrates a transit vehicle with one of the many types of transit vehicle doors (e.g., a swing plug door) to which the inventive subject matter described herein may be used.

The first sliding plate can be directly or indirectly connected with the door post (FIGS. 4 through 6) by one or more cables, gears, or the like, such that movement of the first sliding plate relative to the base plate also rotates the door post. As described above, initial rotation of the door post can unlock the door or doors of the vehicle. Therefore, preventing or delaying movement of the first sliding plate can prevent or delay opening of the vehicle door(s), as described below.

A first end bracket 510 is secured to the base plate at or near one lateral end of the base plate and a second end bracket 512 is secured to the base plate at or near the opposite lateral end of the base plate. An electromagnet 28 is secured to the first end bracket and a second or additional electromagnet 514 is secured to the second end bracket. The first end bracket has an aperture for receiving a jacket-end of a motion transfer cable 530. A first end of the motion transfer cable is connected to the first sliding plate bracket 526. The far end of the motion transfer cable (not shown) is connected to the door lock mechanism. The second end bracket has an aperture for receiving the jacket end of a release cable 516, such as a cable coupled with an emergency release handle of the door. One end of this release cable 516 can be coupled with a second intermediate bracket 518 (described below). A release handle may be coupled with the release cable such that pulling on the release handle may pull on the release cable.

The first sliding plate includes an intermediate bracket 534 in a location between the first and second end brackets. The second sliding plate includes another or second intermediate bracket 518. The intermediate bracket of the first sliding plate is located closer to the first end bracket than the second end bracket, and the intermediate bracket of the second sliding plate is located closer to the second end bracket than the first end bracket. Each of the intermediate brackets supports or is otherwise connected with a plate 36, 520, such as a magnetizable plate. In one embodiment, each of these plates is a magnetizable steel plate. Each of the plates is positioned to be captured by (e.g., engaged by) the corresponding electromagnet.

For example, a first plate 36 faces the first electromagnet 28 such that the first plate can abut the first electromagnet when the first sliding plate slides relative to the base plate toward the first electromagnet. The first plate can be held in place against the first electromagnet by the magnetic field generated by the first electromagnet. The second plate 520 faces the second electromagnet 514 such that the second plate can abut the second electromagnet when the second sliding plate slides relative to the base plate toward the second electromagnet. The second plate can be held in place against the second electromagnet by the magnetic field generated by the second electromagnet.

The first and second electromagnets can operate independent of each other in that the first electromagnet can generate a magnetic field while the second electromagnet is not generating a magnetic field, the second electromagnet can generate a magnet field while the first electromagnet is not generating a magnetic field, or both the first and second electromagnets can generate (or not generate) magnetic fields at the same time. A switch assembly 528 can include one or more electric switches (e.g., relays, contactors, transistors or other solid-state switches) that control supply of electric current or voltage to the electromagnets to control which electromagnet is energized or de-energized.

The first sliding plate can include a supporting plate 526 between the first intermediate bracket and the second intermediate bracket. A second elastic element or member 522 is anchored directly or indirectly at one end to the first intermediate bracket and is connected at the other end directly or indirectly to the second intermediate bracket. This second elastic element or member may be a coil spring, another type of spring, or another elastic body. A first elastic element or member 524 is anchored directly or indirectly at one end to the first intermediate bracket and is connected at the other end directly or indirectly to the supporting plate of the first sliding plate. This first elastic element or member may be a coil spring, another type of spring, or another elastic body. The second elastic element or member can be referred to as a coiled spring and the first elastic element or member can be referred to as a return spring. As shown in FIGS. 5 through 7, the second elastic element or member can bias the first sliding plate and the second sliding plate toward each other, while the first elastic element or member can bias the first sliding plate toward the first electromagnet. For example, the second elastic element or member can pull the first and second sliding plates toward each other while the first elastic element or member can pull the first sliding plate toward the first electromagnet (and away from the second sliding plate).

When the pull force on the emergency release handle is removed (and the corresponding pull force on the release cable is removed), the emergency release handle will reset and consequently the second elastic member will reset also (if the first electromagnet is energized). This can release the energy previously stored in the second elastic member. To ensure that this second elastic member keeps storing the stored energy even when the emergency release handle resets, the second electromagnet can be used to provide for a delayed emergency release of the door lock. The second elastic member keeps storing the energy even when the emergency release handle resets for as long as the second electromagnet is energized. As soon as the second electromagnet is de-energized, the second spring will reset (and release the stored energy) and pull on the motion transfer cable to unlock the door. The de-energizing of the second electromagnet also allows a remote reset of the delayed emergency release if required. For example, the first sliding plate may be pulled to the left in FIGS. 5 through 7 by the second elastic element or member (as the second elastic element or member generates more bias or force than the first elastic element or member, and overcomes any contrary force or bias applied by the first elastic element or member). This movement of the first sliding plate can rotate the door post and, thereby, open the door(s).

In operation, the vehicle may be moving with the door closed and locked. The first elastic element or member can bias the first plate against the energized first electromagnet to secure the first sliding plate in the state shown in FIG. 5. During movement of the vehicle, both the first and second electromagnets can be energized. For example, an engine control unit, vehicle control unit, door control unit, or other controller of the vehicle can send a signal to the switch assembly to change or maintain states of the electromagnets between a powered and an unpowered state. This causes the first and second plates to remain in engaged states where the first and second plates are secured against the respective first and second electromagnets by the magnetic fields created by the first and second electromagnets.

When the emergency handle is pulled by a person onboard the vehicle, the release cable 516 connected to the handle applies a pull force on the end bracket 512 of the base plate 502. Because both the first and second electromagnets are energized (to prevent motion of the motion transfer cable and prevent the doors from unlocking), the second elastic element or member (e.g., the coil spring) is stretched until the second plate comes into contact with the second electromagnet while the first plate remains secured against the first electromagnet. The second electromagnet is energized, so the second plate is held against the second electromagnet. This can latch or secure the coil spring (e.g., the second elastic element or member) in a fully stretched position or state. This position or state of the mechanism is shown in FIG. 6.

The emergency handle may be released and reset, but the energy from pulling of the handle and the cable 516 is still stored in the coil spring, as shown in FIG. 6. When the vehicle slows or stops (e.g., slows to moving slower than a designated threshold speed), the switch assembly can deenergize (e.g., turn off) the first electromagnet. The energy stored in the coil spring (e.g., the second elastic element or member) can pull on the motion transfer cable 530 and therefore unlock and partially or fully open the doors. This state of the mechanism is shown in FIG. 7. While the doors are at least partially open, the switch assembly can deenergize the second electromagnet. This can re-set the mechanism to the initial state shown in FIG. 5.

Once the emergency release handle is released and the energy provided from pulling the cable 516 is stored in the second elastic element or member (e.g., the coil spring), if the driver or operator of the vehicle wants to cancel this emergency release demand while the vehicle is moving (or while the vehicle is not moving), the operator can provide input (e.g., through a controller of the vehicle) that can direct the switch assembly to de-energize the second electromagnet. De-energizing the second electromagnet allows the second elastic element or member (e.g., the coil spring) to release the stored energy and reset the mechanism to the state shown in FIG. 5.

Figure 8:
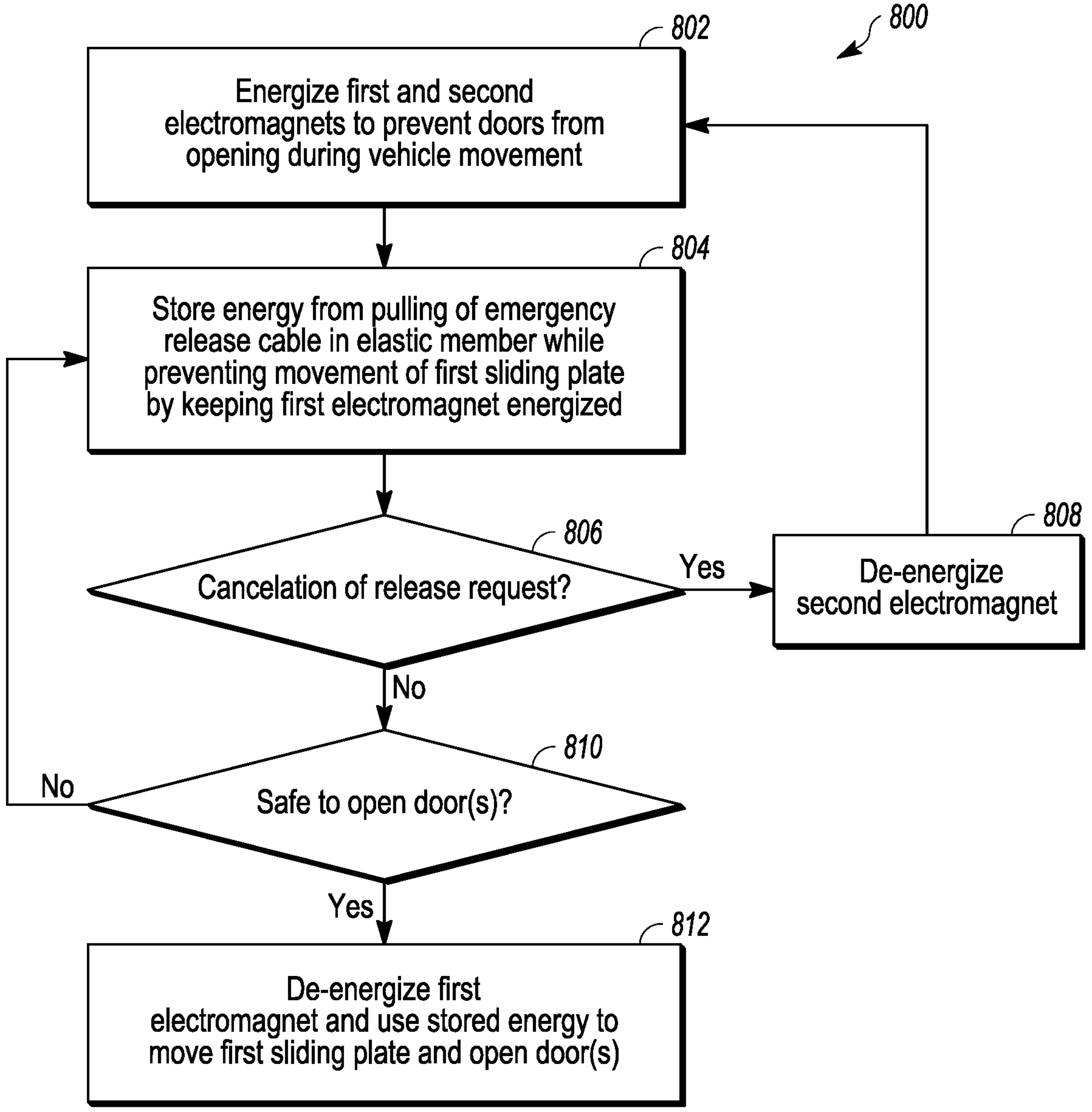
FIG. 8 illustrates a flowchart of one example of a method for delaying release or opening of a locked door of a vehicle.

FIG. 8 illustrates a flowchart of one example of a method 800 for delaying release or opening a locked door of a vehicle. The method can represent operations performed with, using, or by the mechanism described in connection with FIGS. 5 through 7. At step 802, first and second electromagnets are energized. These electromagnets can be energized to prevent the vehicle door(s) from opening (e.g., while the vehicle is moving). For example, the first electromagnet can be energized to prevent the first sliding plate from moving relative to the base plate (and therefore prevent pulling on the motion transfer cable to unlock the door). At step 804, energy imparted to the mechanism from a passenger pulling on a release cable is stored in an elastic member (e.g., a spring) without allowing the door to open. For example, a person pulling on the release cable can pull the second sliding plate to the left in FIGS. 5 through 7, but the first sliding plate is prevented from moving due to the first electromagnet being energized. The second sliding plate can move toward and be secured in a position against the second electromagnet by pulling on the release cable. This movement of the second sliding plate stretches the second elastic member (e.g., the coil spring). The second electromagnet holds the second sliding plate in place, thereby storing the energy from pulling the release cable in the second elastic member. This pulling on the release cable can indicate or be a request to release the lock on the door and/or open the door by the passenger.

At step 806, a decision is made as to whether the request to release the door lock or door has been canceled. For example, a decision is made as to whether the pulling on the release cable at step 804 has ended or the cable continues to be pulled. If the cable is no longer pulled on by a passenger, then flow of the method can proceed toward step 808. But if the cable continues to be pulled, then flow of the method can proceed toward step 810.

At step 808, the second electromagnet is de-energized. For example, responsive to the release request being canceled (e.g., by the cable no longer being pulled), the second electromagnet can be de-energized such that the second plate is no longer held by the second electromagnet. This can permit the second sliding plate to return to the position or state shown in FIG. 5 described above. Flow of the method can then return to another operation (e.g., step 802) or can terminate.

At step 810, a decision is made as to whether it is safe to open the vehicle door(s). For example, the moving speed of the vehicle can be compared to a threshold speed. If the moving speed does not exceed the threshold, then the vehicle may be stopped (e.g., no moving speed) or moving slow enough to allow the vehicle door(s) to safely open. As a result, flow of the method can proceed toward step 812. But if the vehicle is moving faster than the threshold, then the vehicle may be moving too fast to safely open the door(s). As a result, flow of the method can re-evaluate if the conditions are met to safely open the door. For example, flow of the method can return to another operation, such as step 802.

At step 812, the first electromagnet is de-energized. Cutting off conduction of current or voltage to the first electromagnet can allow the second elastic element or member to compress and release the stored energy from pulling on the release cable. The second elastic element or member compressing can allow the first sliding plate to move, which pulls on the motion transfer cable (and thereby unlocks the vehicle door(s)). Flow of the method may return to one or prior or other operations or steps, such as step 802, or may terminate.

Figure 9:
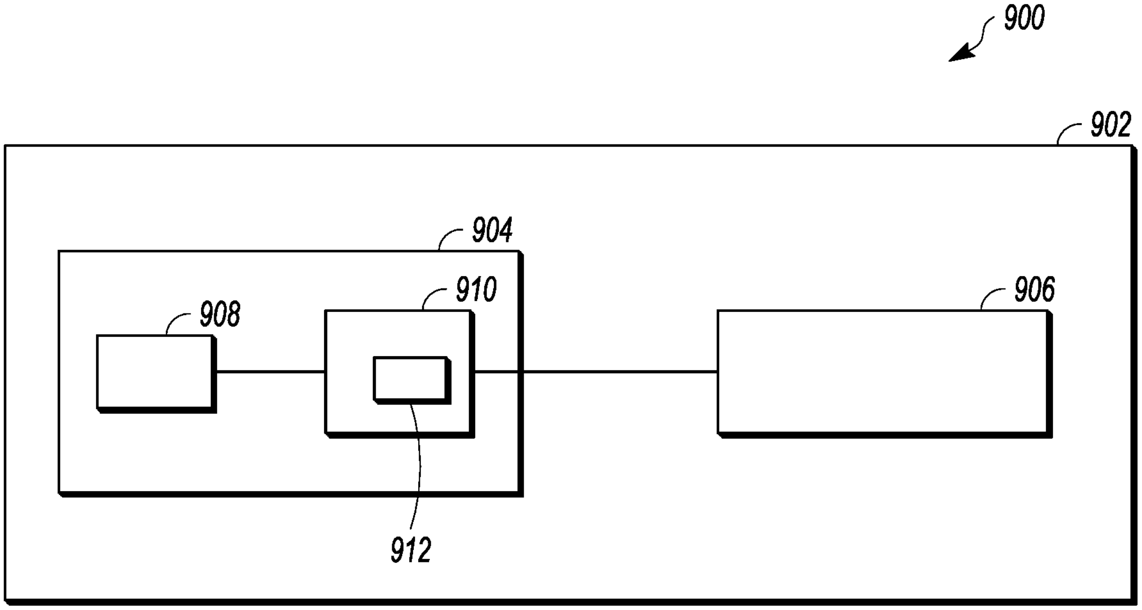
FIG. 9 illustrates an embodiment of a vehicle door control system.

With reference to FIG. 9, in embodiments, a vehicle door control system 900 (e.g., for a train, bus, other transit vehicle, or other vehicle 902) includes a control unit 904 and a vehicle door lock release mechanism 906. The vehicle door lock release mechanism may be configured as set forth in any of the embodiments described hereinabove. The control unit includes a controller 908 having one or more processors. Examples may include an engine controller, a vehicle controller, or a door or vehicle access controller. The controller is configured to be operably deployed onboard the vehicle, e.g., it is configured to be electrically powered by an electrical power source onboard the vehicle. The control unit also includes a switch assembly 910. The switch assembly includes one or more electric switches 912, e.g., relays, contactors, or transistors or other solid-state switches. The switch assembly is electrically connected to the controller, e.g., via one or more wires, and the switch assembly is also electrically connected to the electromagnets of the vehicle door lock release mechanism, e.g., via one or more additional wires. The controller is configured to send electric signals to the switch assembly to control supply of electric current and/or voltage to the electromagnets to control energization and de-energization of the electromagnets. The controller and switch assembly may be integrally housed, either separate from the vehicle door lock release mechanism or together with the vehicle door lock release mechanism (e.g., co-located in or near a door), or the controller and switch assembly may be remote from one another in the vehicle, e.g., the switch assembly may be co-located with the vehicle door lock release mechanism while the controller is located in a vehicle cab, a vehicle electronics cabinet, etc. The control unit may be configured to energize and de-energize the electromagnets of the vehicle door lock release mechanism as set forth in any of the embodiments herein, e.g., the controller may be configured to control the switch assembly to energize and de-energize the electromagnets. For example, the control unit may be configured to energize the first and second electromagnets during movement of the vehicle above a designated threshold speed to prevent opening of the door of the vehicle regardless of the release cable being pulled, and to de-energize first electromagnet responsive to the movement of the vehicle being no faster than the designated threshold speed to delay opening of the door of the vehicle following pulling on the release cable.

In one example, a vehicle door lock release mechanism is provided. The mechanism includes a plate assembly that may be coupled with a vehicle and include a first sliding plate and a second sliding plate that slide in opposite directions relative to each other. The second sliding plate may be pulled away from the first sliding plate by a release cable. The mechanism also can include an elastic member coupled with the plate assembly and first and second electromagnets coupled with the plate assembly. The first electromagnet may be energized to magnetically couple with and prevent movement of the first sliding plate while the second sliding plate may move toward the second electromagnet responsive to the release cable being pulled. The second electromagnet may be energized to magnetically couple with and prevent movement of the second sliding plate once the second sliding plate reaches the second electromagnet. The elastic member may be stretched and store energy from the release cable being pulled while both the first and second electromagnets remain energized. The first electromagnet may be de-energized to permit movement of the first sliding plate and release the energy stored in the elastic member for opening a door of the vehicle.

The first and second electromagnets may be disposed at opposite ends of the plate assembly. The elastic member may be coupled with the first sliding plate at a first end of the elastic member and with the second sliding plate at a second end of the elastic member. The elastic member may be a first elastic member that is coupled with the first sliding plate and the second sliding plate. The mechanism also may include a second elastic member coupled with the first sliding plate that can bias the first sliding plate toward the first electromagnet. The plate assembly may include a base plate that can be coupled with the vehicle. The first and second sliding plates may move in the opposite directions along the base plate.

The first elastic member may be coupled at a first end of the first elastic member to the second sliding plate and at a second end of the first elastic member to the first sliding plate. The second elastic member may be coupled at a third end of the second elastic member to the first sliding plate and at a fourth end of the second elastic member to the base plate.

In another example, a vehicle door control system is provided that includes the vehicle door lock release mechanism and a control unit operably coupled to the vehicle door lock release mechanism. The control unit may energize the first and second electromagnets during movement of the vehicle above a designated threshold speed to prevent opening of the door of the vehicle regardless of the release cable being pulled. The control unit may de-energize the first electromagnet responsive to the movement of the vehicle being no faster than the designated threshold speed to delay opening of the door of the vehicle following pulling on the release cable.

In another example, a vehicle door lock release mechanism is provided that includes a plate assembly including a base plate, a first sliding plate, and a second sliding plate. The base plate may be coupled with a vehicle. The first and second sliding plates may move relative to each other along the base plate. The mechanism also includes an elastic member coupled with the first and second sliding plates, and first and second electromagnets coupled with the base plate. The first electromagnet may be energized to magnetically couple with and prevent movement of the first sliding plate. The second electromagnet may be energized to magnetically couple with and prevent movement of the second sliding plate. The second sliding plate may be pulled along the base plate away from the first sliding plate, away from the first electromagnet, and toward the second electromagnet by pulling of a door lock release cable. The elastic member may be stretched between the first and second sliding plates by the first electromagnet preventing movement of the first sliding plate and the second electromagnet preventing movement of the second sliding plate. The first electromagnet may be de-energized to permit the elastic member to pull the first sliding plate away from the first electromagnet and toward the second sliding plate and thereby release energy stored in the elastic member to open a door of the vehicle.

The first and second electromagnets may be disposed at opposite ends of the base plate. The elastic member may be coupled with the first sliding plate at a first end of the elastic member and with the second sliding plate at a second end of the elastic member. The elastic member may be a first elastic member that is coupled with the first sliding plate and the second sliding plate. The mechanism also can include a second elastic member coupled with the first sliding plate and the base plate. The second elastic member may bias the first sliding plate and the second sliding plate toward each other. The first elastic member may bias the first sliding plate toward the first electromagnet.

In another example, a vehicle door control system is provided that includes the vehicle door lock release mechanism and a control unit that may be operably coupled to the vehicle door lock release mechanism. The control unit may energize the first and second electromagnets during movement of the vehicle above a designated threshold speed to prevent opening of the door of the vehicle regardless of the door lock release cable being pulled.

The control unit may de-energize the first electromagnet responsive to the movement of the vehicle being no faster than the designated threshold speed to delay opening of the door of the vehicle following pulling on the door lock release cable.

In another example, a method is provided that includes energizing a first electromagnet to secure a first sliding plate to the first electromagnet during movement of a vehicle. The first sliding plate may rotate a door post to open a door of the vehicle when the first sliding plate moves away from the first electromagnet. The method also can include receiving a pulling action on a door lock release cable on a second sliding plate. This pulling action may move the second sliding plate toward a second electromagnet. The method also can include securing the second sliding plate against the second electromagnet by energizing the second electromagnet, and de-energizing the first electromagnet to release the first sliding plate from the first electromagnet and permit the door of the vehicle to open.

The first electromagnet may be energized while the movement of the vehicle is faster than a designated speed threshold. The first electromagnet may be de-energized responsive to the movement of the vehicle decreasing to no faster than the designated speed threshold. Energizing the first electromagnet while the movement of the vehicle is faster than the designated speed threshold and de-energizing the first electromagnet responsive to the movement of the vehicle decreasing to no faster than the designated speed threshold may delay opening of the door of the vehicle while the vehicle is moving faster than the designated speed threshold to when the vehicle is not moving or is moving no faster than the designated speed threshold.

The second sliding plate may move toward the second electromagnet and the first electromagnet may secure the first sliding plate stretches an elastic member to store energy from the pulling action on the door lock release cable. De-energizing the first electromagnet may release the energy stored in the elastic member to open the door of the vehicle.

Having thus defined our invention with the detail and particularity required by the Patent Laws, what is desired protected by Letters Patent is set forth in the following claims.

The singular forms "a," "an," and "the" include plural references unless the context clearly dictates otherwise. "Optional" or "optionally" means that the subsequently described event or circumstance may or may not occur, and that the description may include instances where the event occurs and instances where it does not. Approximating language, as used herein throughout the specification and claims, may be applied to modify any quantitative representation that could permissibly vary without resulting in a change in the basic function to which it may be related. Accordingly, a value modified by a term or terms, such as "about," "substantially," and "approximately," may be not to be limited to the precise value specified. In at least some instances, the approximating language may correspond to the precision of an instrument for measuring the value. Here and throughout the specification and claims, range limitations may be combined and/or interchanged, such ranges may be identified and include all the sub-ranges contained therein unless context or language indicates otherwise.

This written description uses examples to disclose the embodiments, including the best mode, and to enable a person of ordinary skill in the art to practice the embodiments, including making and using any devices or systems and performing any incorporated methods. The claims define the patentable scope of the disclosure, and include other examples that occur to those of ordinary skill in the art. Such other examples are intended to be within the scope of the claims if they have structural elements that do not differ from the literal language of the claims, or if they include equivalent structural elements with insubstantial differences from the literal language of the claims.

What is claimed is:

1. A vehicle door lock release mechanism, comprising:

a plate assembly configured to be coupled with a vehicle, the plate assembly including a first sliding plate and a second sliding plate configured to slide relative to each other, the second sliding plate configured to be pulled away from the first sliding plate by a release cable;

an elastic member coupled with the plate assembly; and first and second electromagnets coupled with the plate assembly, the first electromagnet configured to be energized to magnetically couple with and prevent movement of the first sliding plate while the second sliding plate is configured to move toward the second electromagnet responsive to the release cable being pulled, the second electromagnet configured to be energized to magnetically couple with and prevent movement of the second sliding plate once the second sliding plate reaches the second electromagnet after the release cable has been pulled, the elastic member configured to be stretched and store energy from the release cable being pulled while both the first and second electromagnets remain energized, the first electromagnet configured to be de-energized to permit movement of the first sliding plate and release the energy stored in the elastic member for opening a door of the vehicle.

2. The vehicle door lock release mechanism of claim 1, wherein the first and second electromagnets are disposed at opposite ends of the plate assembly.

3. The vehicle door lock release mechanism of claim 1, wherein the elastic member is coupled with the first sliding plate at a first end of the elastic member and with the second sliding plate at a second end of the elastic member.

4. The vehicle door lock release mechanism of claim 1, wherein the elastic member is a first elastic member that is coupled with the first sliding plate and the second sliding plate, and the vehicle door lock release mechanism further comprising:

a second elastic member coupled with the first sliding plate and configured to bias the first sliding plate toward the first electromagnet.

5. The vehicle door lock release mechanism of claim 4, wherein the plate assembly includes a base plate that is configured to be coupled with the vehicle, the first and second sliding plates configured to move relative to one another along the base plate.

6. The vehicle door lock release mechanism of claim 5, wherein the first elastic member is coupled at a first end of the first elastic member to the second sliding plate and at a second end of the first elastic member to the first sliding plate, and the second elastic member is coupled at a third end of the second elastic member to the first sliding plate and at a fourth end of the second elastic member to the base plate.

7. A vehicle door control system comprising the vehicle door lock release mechanism of claim 1 and a control unit operably coupled to the vehicle door lock release mechanism, wherein the control unit is configured to energize the first and second electromagnets during movement of the vehicle above a designated threshold speed to prevent opening of the door of the vehicle regardless of the release cable being pulled, and the control unit is configured to de-energize the first electromagnet responsive to the movement of the vehicle being no faster than the designated threshold speed to delay opening of the door of the vehicle following the pulling of the release cable.

8. A vehicle door lock release mechanism, comprising:

a plate assembly including a base plate, a first sliding plate, and a second sliding plate, the base plate configured to be coupled with a vehicle, the first and second sliding plates configured to move relative to each other along the base plate;

an elastic member coupled with the first and second sliding plates; and first and second electromagnets coupled with the base plate, the first electromagnet configured to be energized to magnetically couple with and prevent movement of the first sliding plate, the second electromagnet configured to be energized to magnetically couple with and prevent movement of the second sliding plate, the second sliding plate configured to be pulled along the base plate away from the first sliding plate, away from the first electromagnet, and toward the second electromagnet by pulling of a door lock release cable, the elastic member configured to be stretched between the first and second sliding plates by the first electromagnet preventing movement of the first sliding plate and the second electromagnet preventing movement of the second sliding plate after the door lock release cable has been pulled, the first electromagnet configured to be de-energized to permit the elastic member to pull the first sliding plate away from the first electromagnet and toward the second sliding plate and thereby release energy stored in the elastic member to open a door of the vehicle.

9. The vehicle door lock release mechanism of claim 8, wherein the first and second electromagnets are disposed at opposite ends of the base plate.

10. The vehicle door lock release mechanism of claim 8, wherein the elastic member is coupled with the first sliding plate at a first end of the elastic member and with the second sliding plate at a second end of the elastic member.

11. The vehicle door lock release mechanism of claim 8, wherein the elastic member is a first elastic member that is coupled with the first sliding plate and the second sliding plate, and the vehicle door lock release mechanism further comprising:

a second elastic member coupled with the first sliding plate and the base plate.

12. The vehicle door lock release mechanism of claim 11, wherein the second elastic member is configured to bias the first sliding plate and the second sliding plate toward each other, the first elastic member configured to bias the first sliding plate toward the first electromagnet.

13. A vehicle door control system comprising the vehicle door lock release mechanism of claim 8 and a control unit configured to be operably coupled to the vehicle door lock release mechanism, wherein the control unit is configured to energize the first and second electromagnets during movement of the vehicle above a designated threshold speed to prevent opening of the door of the vehicle regardless of the door lock release cable being pulled.

14. The system of claim 13, wherein the control unit is configured to de-energize the first electromagnet responsive to the movement of the vehicle being no faster than the designated threshold speed to delay opening of the door of the vehicle following the pulling of the door lock release cable.

15. A method, comprising:

energizing a first electromagnet to secure a first sliding plate to the first electromagnet during movement of a vehicle, the first sliding plate configured to rotate a door post to open a door of the vehicle when the first sliding plate moves away from the first electromagnet;

receiving a pulling action on a door lock release cable on a second sliding plate, the pulling action moving the second sliding plate toward a second electromagnet;

securing the second sliding plate against the second electromagnet by energizing the second electromagnet; and de-energizing the first electromagnet to release the first sliding plate from the first electromagnet and rotating the door post to open the door of the vehicle.

16. The method of claim 15, wherein the first electromagnet is energized while the movement of the vehicle is faster than a designated speed threshold.

17. The method of claim 16, wherein the first electromagnet is de-energized responsive to the movement of the vehicle decreasing to no faster than the designated speed threshold.

18. The method of claim 17, wherein energizing the first electromagnet while the movement of the vehicle is faster than the designated speed threshold and de-energizing the first electromagnet responsive to the movement of the vehicle decreasing to no faster than the designated speed threshold delays the rotating of the door post to open the door of the vehicle while the vehicle is moving faster than the designated speed threshold to when the vehicle is not moving or is moving no faster than the designated speed threshold.

19. The method of claim 15, wherein the second sliding plate moving toward the second electromagnet and the first electromagnet securing the first sliding plate stretches an elastic member to store energy from the pulling action on the door lock release cable.

20. The method of claim 19, wherein de-energizing the first electromagnet releases the energy stored in the elastic member to rotate the door post and open the door of the vehicle.

* * * * *